Dec. 5, 1939.  L. J. G. GREEN  2,182,585

CAMERA FILTER

Filed April 20, 1938

INVENTOR.
Lewis J. G. Green
BY Louis Schumacher ATTORNEY.

Patented Dec. 5, 1939

2,182,585

UNITED STATES PATENT OFFICE 2,182,585

CAMERA FILTER

Lewis J. G. Green, Jackson Heights, N. Y.

Application April 20, 1938, Serial No. 203,007

2 Claims. (Cl. 95—81.5)

This invention relates to devices such as light filters for cameras and other photographic work.

One object of the invention is to provide an improved photographic light filter which shall be nonbreakable.

Another object of the invention is the provision of an improved photographic filter embodying a colored material whose color standards are much easier to maintain in manufacture than those of glass, and which shall cost only a small fractional part as much as a glass filter.

Another object of the invention is to furnish an improved light filter wherein a series of nonbreakable differently colored filter elements can be selectively associated with a single mounting.

Another object of the invention is to construct an improved camera filter, the colored element whereof shall be so cheap as to be discarded when it is desired to use an element of a different color.

Another object of the invention is to provide an improved photographic filter whereby one colored filter element or a plurality of such elements of different colors for producing an intermediate color, can be removably mounted at will on a simplified holder unit.

Another object of the invention is to furnish an improved telescopic holder for pliable filter elements, which holder, if required, shall be adapted for engagement with different kinds or styles of cameras.

A further object of the invention is the provision of an improved light filter unit for photographic work comprising pliable filter sheets, any of which can be readily mounted by anyone of little or no mechanical experience, in course of assembling the filter unit, and with the pliable sheet nevertheless uniformly accurately mounted for reliable photographic work.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

Figure 1:
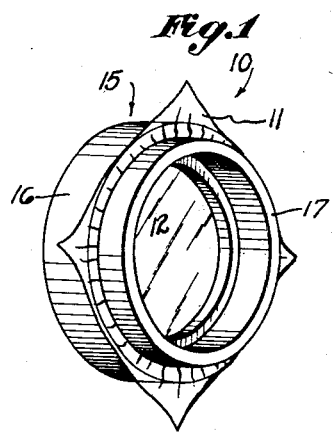
Figure 1 is a perspective view of a filter unit embodying the invention.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device, such as a photographic filter embodying the invention. The same comprises a sheet member 11 of colored Cellophane or other inexpensive colored, transparent cellulose material well known in the art of plastics. Preferably, the sheet member 11 is very thin, highly pliable, possesses a suitable degree of tensile strength, and is very clear and transparent, and is well adapted to afford a uniform and accurate color or shade for the precision filtering of light rays according to the standards of the photographic art. I have found that Cellophane in different colors is commercially available at very low cost to meet all of these requirements.

It will be noted that the filter element 11 is arranged to afford a plane, taut window portion 12 which is normally arranged to operatively overlie or confront the lens unit 13 of a camera or other photographic instrument 14. While it may be possible to thus mount the element 11 by various means, I prefer to utilize the holder 15 which will now be described.

Figure 2:
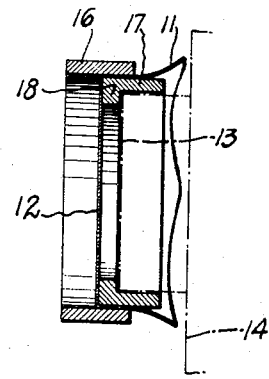
Fig. 2 is a sectional view thereof, showing the unit mounted on a camera, indicated in part in dot-dash lines.
Figure 3:
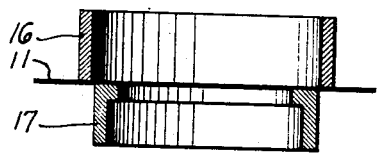
Fig. 3 is a sectional view showing the filter unit in course of being assembled.
Figure 4:
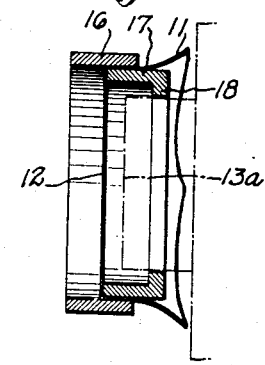
Fig. 4 is a sectional view of the filter unit according to a different assembly arrangement for mounting on a different camera.
Figure 6:
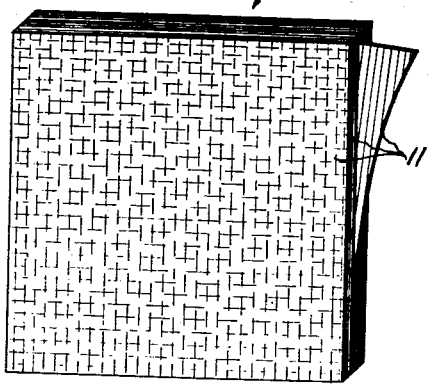
Fig. 6 is a view of a pack of the filter elements, embodying the invention.

The holder 15 may include one or more window frame elements over which the filter element 11 may be stretched taut and secured. The invention is best exemplified by a pair of telescopic rings 16, 17 which functionally cooperate with the filter element 11 in automatically or inherently stretching the same smooth along a plane in course of assembling the device 10, to thus directly operatively mount the filter element. It will be noted that the filter element 11 may be placed as a flat sheet over the inner ring 17, as shown in Fig. 3, and then the ring 16 removably forced down to circularly bend the sheet 11 and frictionally clamp the same as shown in Fig. 2. Due to the frictional engagement, the window portion 12 of the filter element is uniformly radially tensioned to lie smooth and taut along a plane determined by the adjacent side of the ring 17. If desired, two filter sheets 11 of different colors, to produce an intermediate color, may be thus secured instead of only one sheet. The rings afford sufficient clearance therebetween for that purpose. If required, the inner ring 17 may be a permanent part of the camera or may be considered to be a part of the lens unit 13.

Because the filter element 11 is perfectly smooth in texture, tearing thereof is avoided. Nevertheless the clamping is highly effective, since the sheet 11 becomes folded or crinkled to afford an increased mass along the surface of telescopic engagement.

Figure 5:
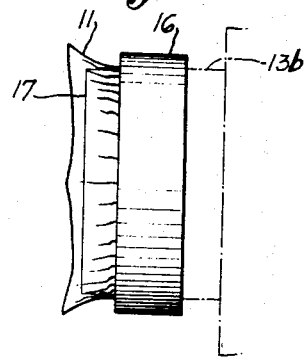
Fig. 5 is a view in elevation of the filter unit mounted on a third style of camera, with the filter unit reversed relative to its position in Fig. 2.

It is desirable that the device 10 shall be engageable with lens units of at least three different sizes. For this purpose, I provide an inner annular lip or shoulder 18 on the ring 17, to form a stop and prevent the filter element from being pushed out by the lens unit, as shown in Fig. 2. By reversing the position of the ring 17, the lip 18 thereof is engageable with a lens unit 13a of a different diameter. A third size of lens unit 13b may be engageable in the outer ring 16 as shown in Fig. 5 by merely reversing the device 10. To hold the device 10 on a camera the engagement with the lens unit may be frictional, as by providing a yielding tape or tab on the lens unit or on the engaging part of a ring.

At 19 is shown a pack or group of the filter sheets 11 of different colors, arranged so as to be adapted to be sold in a package. Thus the operator has a large variety of colors from which to select the one required. These filter sheets are so inexpensive, that when one is removed from the holder 15, it may be discarded. The filter is, of course, not liable to breakage as in the case of glass, should the device 10 be inadvertently dropped on the ground. The ring elements 16 and 17 are of highly simplified structure and well adapted for quantity production. The mode of assembling and disassembling the device 10 requires no particular explanation, and is foolproof. If desired, the filter sheets 11 may carry markings to indicate the relative exposures required. If desired, the filter sheets may also be used to afford light diffusion effects. For this purpose the sheets 11 may have parallel printed or score lines, and the latter may be produced by a pressure marking tool.

It will now be seen that I have produced a filter device which fulfills the objects of the invention and is well adapted for practical use.

I claim:

1. A device including a camera filter comprising a colored sheet member of pliable transparent, Cellophane material, and means for mounting the same taut along a plane, including a plurality of telescopic ring members, the sheet member overlying one of the ring members and being marginally frictionally secured between the ring members, said sheet member being stretched taut by the frictional engagement with the ring members in course of telescopically interengaging the latter, said ring members being axially partially staggered and said means providing a plurality of openings of different sizes adapted for engagement with different cameras to mount the filter.

2. A device including a light filter comprising a sheet member of colored Cellophane material and a pair of telescopic rings frictionally securing the sheet member therebetween in taut condition over one of the rings, said rings having different internal diameters for securement to lens units of different sizes, with a portion of each ring being axially offset from the other ring, and the inner ring having an annular internal lip for securement to a lens unit of a different size.

LEWIS J. G. GREEN.